United States Patent [19]

Coppers

[11] Patent Number: 4,992,344

[45] Date of Patent: Feb. 12, 1991

[54] CELL CIRCUIT INTERRUPTER

[75] Inventor: John C. Coppers, Westlake, Ohio

[73] Assignee: Eveready Battery Company, Inc., St. Louis, Mo.

[21] Appl. No.: 350,198

[22] Filed: May 11, 1989

[51] Int. Cl.⁵ .............................................. H01M 2/34
[52] U.S. Cl. ........................................ 429/61; 429/66
[58] Field of Search .................. 429/53, 56, 61, 66

[56] References Cited

U.S. PATENT DOCUMENTS

| | | | |
|---|---|---|---|
| 4,227,701 | 10/1980 | Tsuchida et al. | 429/53 X |
| 4,788,112 | 11/1988 | Kung | 429/61 X |
| 4,818,691 | 4/1989 | Ledenican | 429/61 |
| 4,871,553 | 10/1989 | Huhndorff | 429/61 |
| 4,937,153 | 6/1990 | Huhndorff | 429/61 |

*Primary Examiner*—Stephen J. Kalafut
*Attorney, Agent, or Firm*—Robert W. Welsh

[57] ABSTRACT

The invention relates to a galvanic cell having a failsafe circuit interrupter means for electrically isolating one cover terminal of the cell from the cells electrochemical system when the closed end of the container bulges beyond a predetermined amount in response to internal pressure buildup.

18 Claims, 1 Drawing Sheet

CELL CIRCUIT INTERRUPTER

FIELD OF THE INVENTION

The invention relates to a galvanic cell and more specifically to a cylindrical galvanic cell having a failsafe circuit interruption means for electrically isolating one terminal of the cell from the cell's electrochemical system when the closed end of the cylindrical container bulges beyond a predetermined amount when subject to internal pressure buildup.

BACKGROUND OF THE INVENTION

Galvanic cells, such as alkaline cells, are generally designed to vent when the internal pressure exceeds a predetermined amount. When exposed to an abuse condition, such as being charged to an excessive degree, the cell is designed to vent and allow gas to escape. Under certain abuse conditions, electrolyte entrained in the gas may be forced from the cell. It is preferable to have the electrolyte escape rather than have the cell rupture from internal pressure buildup.

Cell manufacturers have used a number of approaches to resolve the problem of expelling electrolyte during venting. One method of preventing seal rupture due to abuse charging or the like is to insert a diode in the battery's electrical circuit. By eliminating the possibility of charging the cells, internal gas is not generated and the seal never ruptures. Another electrically related mechanism is a belleville shaped "flip switch". This device is triggered by bulging of the closed end of the cell's cylindrical container which causes a washer to invert and thereby break electrical contact. Another method involves the use of adsorbents or electrolyte thickeners. The absorbent materials are usually located outside the seal area and beneath the cell's cover or jacket. As electrolyte escapes from a ruptured seal, the liquid is absorbed. Spew thickeners are mixed with the electrolyte and therefore are contained within the cell. The objective of the thickener is to slow down and/or absorb any leakage that may occur. The disadvantage of using either an absorbent or a thickener is that both materials tie up space that otherwise could be used for active materials of the cell. A third procedure is to use an outer container and end covers as an electrolyte containment system to provide space to contain the electrolyte that may escape.

U.S. Pat. No. 3,676,221 discloses a battery comprising a plurality of stacked, disk-like sealed cells secured together by cups fitted over one cell and having bottoms spot-welded to the next cell and sidewalls spot-welded to the interfitting cell. A heat-shrunk sheath encloses the battery and has caps forming the poles. Between each pair of cells is a circular disc of insulating material against which the cup bottoms bulge upon expansion of the contents of the cells, thereby breaking the welds and electrically disconnecting the cells.

U S. Pat. No. 4,025,696 describes a disk shaped washer which inverts after the bottom bulge exceeds a predetermined value. Prior to activation, the washer's inside diameter is slanted toward the container. As the container bulges, the bottom of the container pushes against the washer and eventually causes the washer to invert. This inversion electrically separates the bottom cover from the container. An open circuit is the net result.

U.S. Pat. No. 3,775,661 describes a cell in which internal pressure forces a diaphragm against a switch which electrically disconnects a charging device. The diaphragm is located inside a venting device which is attached to one end of the cell.

U.S. Pat. No. 2,651,669 describes a bulge activated switch that can be incorporated into a single cell battery or a multiple cell battery and operable such that the bulge can be used to open a switch or switches that control the cell's discharging and/or charging circuits.

U.S. Pat. No. 3,617,386 describes a cell in which a thin sheet of metal with "spring back" ability is positioned between the seal and cover of the cell so as to break the cell s electrical circuit when the bulge becomes excessive.

U.S. Pat. No. 3,081,366 describes a sealed cell having a metallic sheet member connected to one cell electrode and its periphery insulating affixed to an open casing end and an overlying exposed metallic terminal insulating held over the sheet member. A movable switch portion normally connects an intermediate pressure-deflectable sheet member portion to the external terminal and, in response to outward motion of the deflected sheet portion under excess internal pressure the switch portion disconnects the external terminal from the deflected sheet portion.

U.S. Pat. No. 3,373,057 describes a cell in which the cover of the casing of the cell is provided centrally with an inwardly concave-contact button. A dished (which is to say concave convex) snap-acting spring disc of the automatic reset type is marginally sealed to the inside of the cover. An automatic reset disc after snapping in one direction in response to pressure on its convex side will return with snap action when the pressure is relieved. The disc is provided centrally with a sealed movable contact for engagement and disengagement with an internal fixed contact when the disc snaps to and fro. The arrangement is such that when the contacts are engaged the disc is slightly sprung toward the cover but short of causing snap action. This maintains good electrical contact pressure under safe internal gas pressures. The fixed contact is electrically connected with one set of battery plates and the other set of plates is electrically connected with the casing.

U.S. Pat. No. 4,690,879 describes a cylindrical galvanic cell employing a unitary type cover welded to the container as a failsafe circuit interruption means for electrically isolating one terminal of the cell from the cell s electrochemical system when the bottom of the cylindrical cell bulges beyond a predetermined amount so that the unitary cover breaks electrical contact with the housing of the cell.

U.S. Pat. No. 4,756,983 describes a cylindrical galvanic cell employing a cover having a peripheral flange electrically contacting the conductive container of the cell and whereby a predetermined bulge in the bottom of the container will cause the central portion of the cover to separate from the peripheral flange portion thereby electrically isolating the central portion of the cover from the cell.

In U.S. Pat. No. 4,937,153, filed Aug. 29, 1988 a circuit interrupter means is disclosed in which a dependant skirt from a peripheral flange of a conductive cover electrically contacts the conductive container of a cell. The cell is assembled so that a predetermined bulge in the bottom of the container will cause the cover to move away from the container and break the electrical contact between the skirt of the cover and the container.

It is an object of this invention to provide a galvanic cell with novel means for electrically isolating one terminal of the cell from the cell's electrochemical system upon reaching a predetermined internal pressure in the cell's housing.

Another object of this invention is to provide means for electrically isolating one terminal of a galvanic cell from the cell's electrochemical system upon reaching a predetermined bulge in the cell's housing and that will occupy minimum additional space so as not to significantly diminish the space allocated for the active components of the cell.

Another object of this invention is to provide a sealed galvanic cell with means of electrically isolating one terminal of the cell from the electrochemical system of the cell upon reaching a predetermined bulge in the cell's housing that is easy to make, cost effective and easy to assemble.

The foregoing and additional objects will become more fully apparent from the following description and the accompanying drawing.

SUMMARY OF THE INVENTION

The invention relates to a sealed galvanic cell comprising a conductive container having an upstanding wall open at one end and closed at the opposite end and including in said container a positive electrode, a negative electrode and an electrolyte, said conductive container being in electrical contact with one of said electrodes; a first cover mounted over, secured to and electrically insulated from said open end of said conductive container and in electrical contact with the other electrode; a conductive member comprising a central protrusion portion with an extending flange disposed over and electrically insulated from the container; a conductive ring member disposed over the conductive member with the protrusion portion extending through and electrically contacting the wall defining an opening in the ring member, said ring member having an inner segment disposed over and electrically insulated from the flange of the conductive member and having a peripheral segment secured to and in electrical contact with the container thereby securing the conductive member to the container and adapting the conductive member as a terminal for the cell; and wherein the closed end of the container will bulge upon a predetermined pressure buildup within the container to force the central protrusion portion of the conductive member outward thereby breaking the electrical contact between the wall defining the opening in the conductive ring and the protrusion portion of the conductive member. The end portion of the wall defining the opening in the conductive ring could be bent upward so that the sharp corners of the edge would not be positioned against the protrusion portion of the conductive member.

The conductive member should preferably be rigid so that as the closed end of the container bulges, it will force the rigid conductive member outward thereby breaking the electrical contact between the wall defining the wall of the conductive ring and protrusion portion of the conductive member. The insulating means for insulating the central protrusion portion of the conductive member from the closed end of the container should also preferably be a rigid material in the form of a disc This will enable the bulge in the closed end of the container to force the rigid disc outward which in turn will project the central protrusion portion of the conductive member outward to break the electrical contact between the protrusion portion and the wall defining the opening in the ring. By being rigid, the disc will be forced outward substantially normal to the longitudinal axis of the container so as to ensure that the central protrusion portion of the conductive member will likewise be forced outward substantially normal to the longitudinal axis of the container so that the protrusion portion of the conductive member will break contact with the wall defining the opening in the conductive ring. In this arrangement, the wall defining the opening of the conductive member is assured of breaking contact with the protrusion portion of the conductive member upon a predetermined pressure buildup within the container. The insulative member between the conductive member and the closed end of the container could be a disc made of plastic, paper, ceramic or the like. In some embodiments of the invention, the insulating member could be a thin layer of an electrically nonconductive paint or the like. When the insulating material is a disc, the disc could be conductive or nonconductive provided that if it is conductive, then it must be covered with a nonconductive material.

The ring member used to secure and maintain the conductive member in contact with the closed end of the container has to be conductive so that an electrically insulating annulus shaped material, will have to be disposed between the outer upper surface of the flange of the conductive member and the undersurface of the inner segment of the ring so that the ring will be insulated from the conductive member. In another embodiment of the invention, if the annulus was made of an electrically conductive material, then the annulus must be covered with an electrically nonconductive material.

In another embodiment, a single insulating material could be disposed on the upper surface and lower surface of the flange of the conductive member so that it would effectively insulate the conductive member from the container and insulate the upper surface of the flange from the inner segment of the conductive ring. A requirement in all of these embodiments is that the wall defining the opening in the conductive ring make electrical contact with the upstanding external wall of the protrusion portion of the conductive member. Preferably, the ring should have a friction fit over the protrusion portion of the conductive member to insure good electrical contact with the protrusion portion of the conductive member.

A necessary feature of this invention is that the central protrusion portion of the conductive member be insulated from the conductive container and be in electrical contact with the wall defining the opening in the conductive ring. To secure the conductive member to the closed end of the container, means are used such as a ring that can be placed over the protrusion portion of the conductive member and bear against the flange of the conductive member while its peripheral portion is secured to the container using welds or similar securing means. The conductive member should be preferably centered on the closed end of the container such that when the closed end of the container bulges, the conductive member will project away from the container and break the electrical contact with the conductive ring which is in electrical contact with the container.

If desired, a plastic film or pressure sensitive adhesive tape or tubing could encase the cell and extend over the edge of the conductive cover. The plastic film, tape or tubing could be heat shrinkable and made from a material such as polyvinyl chloride, polyvinylidene chloride and polyolefins such as polyethylene and polypropylene.

In a preferred embodiment, the container would be a cylindrical container; the electrically insulating material between the conductive member and the container would be an electrically nonconductive disc; the conductive member would be a hat-shaped conductive member with an extending flange; and the securing means would be a conductive ring-shaped member.

The subject invention will effectively eliminate electrolyte leakage due to abusive charging or overdischarging, require a minimum amount of additional electrical component, is relatively simple to incorporate into a manufacturing process, and effectively does not take up any usable space within the cell s interior. If desired, an electrically nonconductive or conductive adhesive could be used to secure the insulating disc to the container. This adhesive would hold the insulating disc substantially perpendicular to the container s longitudinal axis so that as the closed end of the container bulges, the disc will move parallel to the longitudinal axis and thereby assure that the conductive member will break electrical contact between the protrusion portion of the conductive member and wall defining the opening in the conductive ring. Suitable nonconductive adhesives for this invention are asphalt, acrylic type adhesives, epoxy type adhesives, cyanoacrylate type adhesives, silicone type adhesives, hot melts and the like.

In some applications the control of the degree of bulge to move the cover from the container could be somewhat critical. For commercial applications, the conductive member should not be electrically insulated from the container when the amount of bulge is that which normally would occur when the cell is subject to high temperature storage. Thus the degree of bulge should generally be beyond the normal bulge that can be encountered in high temperature storage but below the degree of bulge that will break the seal and let electrolyte escape. For example, in a standard type alkaline D-size cylindrical cell (2.277 inches high and 1.318 inches diameter), the bottom of the container could bulge as much as 0.025 inch when stored at 71° C. for an eight (8) week period and can vent when the bulge exceeds 0.070 inch. Consequently, for this size and type cell system, the bottom or closed end of the container should be made to bulge between about 0.030 to about 0.070 inch during electrical charging and the conductive member should be made to break electrical contact with the container when such a bulge occurs.

The invention is ideally suited for alkaline cells employing an MnO$_2$ positive electrode, a zinc negative electrode and an electrolyte solution comprising potassium hydroxide.

The present invention will become more apparent from the following description thereof when considered together with the accompanying drawing which is set forth as being exemplary of the present invention and is not intended to be limitative thereafter in any respect.

Figure 1:
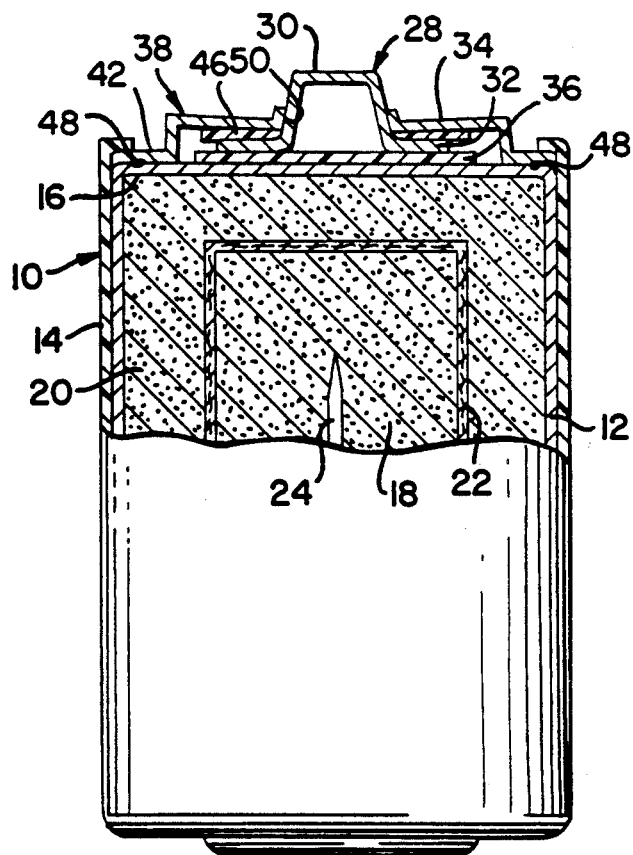
FIG. 1 is an elevational view partially in cross section of an alkaline manganese dioxide zinc cell embodying a circuit interrupter means of the present invention.

Disposed within the container 12 is an anode 18, a cathode 20, a separator 22 and an alkaline electrolyte which permeates the anode 18, cathode 20, and separator 22, respectively. An anode current pin type collector 24 extends lengthwise within the cell 10, parallel to the longitudinal axis of the cell, from a location in contact with the anode 18 to the negative end 26 of the cell 10 where it terminates.

Figure 2:
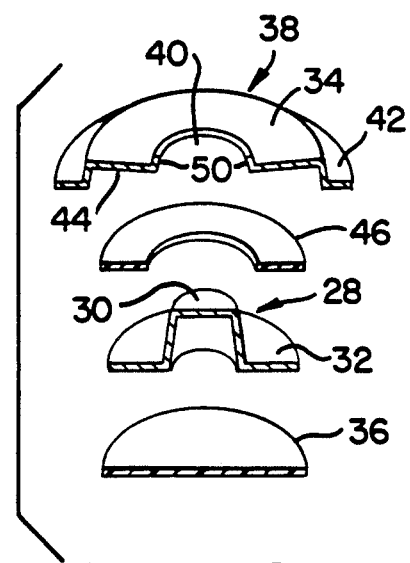
FIG. 2 is an exploded view of the top component part of the cell shown in FIG. 1.

A hat-shaped conductive member 28 is shown in FIGS. 1 and 2 with a central protrusion portion 30, terminating with an extending flange 32. Disposed between conductive member 28 and surface 16 of container 12 is a nonconductive disc 36 that insulates the central protrusion portion 30 and flange 32 from container 12 A conductive ring 38 defining an opening 40 comprises an inner segment 34 and a peripheral segment 42. Opening 40 is of a desired size to permit the central protrusion portion 30 of conductive member 28 to pass through preferably in a friction fit while the undersurface 44 of the inner segment 34 of ring 38 is superimposed on flange 32 of conductive member 28. Disposed between the undersurface 44 of the inner portion 34 of ring 38 and the upper surface of flange 32 of conductive member 28 is a nonconductive ring 46 FIG. 2 shows an exploded view of these components while FIG. 1 shows the components assembled on the closed end of container 12. The peripheral flange 42 of ring 38 is secured to the closed end of the container by welds 48. This ring 38 has its inner portion 44 bearing against nonconductive ing 46 which contacts flange 32 of conductive member 28. Thus conductive member 28 is secured to the closed end 16 of container 12 by ring 38. The inner wall 50 defining opening 40 in conductive ring 38 is bent upward so that the sharp corner of the edge of the wall will not be positioned against the conductive member. In some applications, it may not be necessary to bend the wall defining the opening in the conductive ring as shown in the drawings The inner wall 50 bears against the protrusion portion 30 of conductive member 28, preferably in an interference fit, to insure good electrical contact between the conductive ring 38 and the conductive hat-shaped member 28 thereby adapting conductive member 28 as a terminal for the cell.

Figure 3:
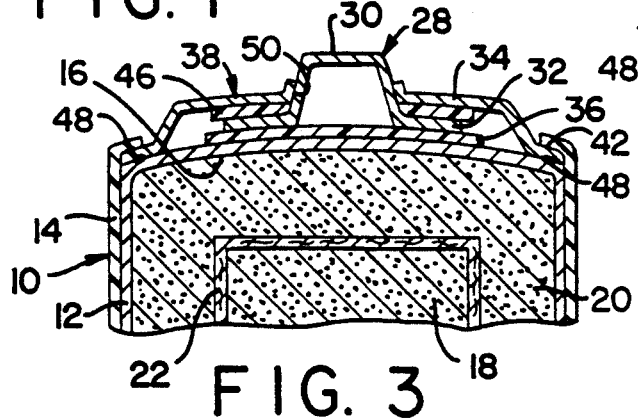
FIG. 3 is an elevational view of part of the cell in FIG. 1 showing the bottom closed end of the container with a slight bulge insufficient to lift the conductive member away from contact with the container.

FIG. 3 shows the cell of FIG. 1 with the same components identified with the same reference numbers. As shown in FIG. 3, the closed end 16 of container 12 bulges a slight amount insufficient to lift conductive member 28 outward and away from closed end 16 of container 12 to break the electrical contact between the inner wall 50 defining opening 40 in conductive ring 38 and protrusion portion 30 of conductive member 28. Thus the conductive member 28 will not break electrical contact with container 12 when the amount of bulge is that which normally would occur when the cell is subject to high temperature storage.

Figure 4:
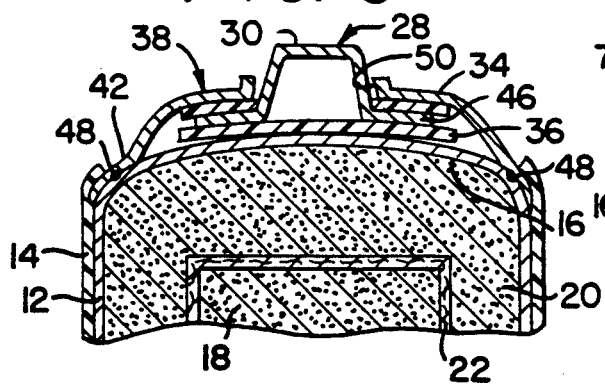
FIG. 4 is an elevational view of the cell in FIG. 3 showing the conductive member lifted off the container thereby breaking electrical contact with the container.

FIG. 4 shows the cell of FIG. 3 with the same components identified with the same reference numbers. As shown in FIG. 4, the closed end 16 of container 12 bulges sufficiently to lift conductive member 28 outward and away from closed end 16 of conductive container 12 to break the electrical contact between the inner wall 50 defining opening 40 in conductive ring 38 and protrusion portion 30 of conductive member 28. This will isolate conductive member 28 from the electrochemical system of the cell when the closed end 16 of container 12 bulges beyond the normal bulge that could be encountered in high temperature storage but below the degree of bulge that will break the seal and let electrolyte escape.

As evidenced from FIG. 4, conductive member 28 is still secured to the cell 10 via ring 38 thereby preventing conductive member 28 from being expelled from the cell upon internal pressure buildup. By proper selection of the component parts of the failsafe circuit interrupter means, the cell can be made to bulge so as to break the electrical contact between conductive member 28 and container 12 prior to the cell venting or rupturing which would cause electrolyte to escape.

Figure 5:
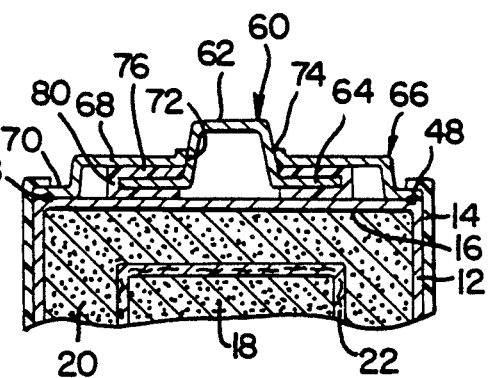
FIG. 5 is a view of another embodiment of this invention showing an elevational view of the bottom part of a cell employing a modified conductive member as a circuit interrupter means of the present invention
Figure 6:
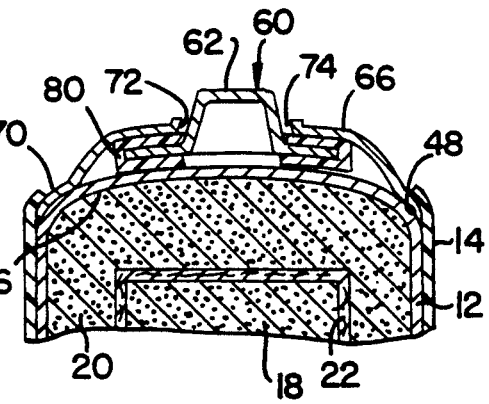
FIG. 6 is an elevational view of the cell in FIG. 5 showing the modified conductive member lifted off the container thereby breaking electrical contact with the container Referring now to FIGS. 1-2 in which a typical alkaline galvanic cell 10 of the present invention is shown comprising an inverted metallic cupped container 12 provided, if desired, with an outer plastic shrink film 14. The container 12 has a closed end surface 16.

FIGS. 5 and 6 show another embodiment of a cell of the invention in which similar parts to those shown in FIGS. 1 through 4 are identified with the same reference numbers. Specifically FIGS. 5 and 6 show a conductive member 60 comprising a central protrusion portion 62 extending with an inclined flange 64. Conductive ring 66 comprises an inner segment 68 and peripheral edge 70. Inner wall 72 defines opening 74 in conductive ring 66. An insulated material 80, such as a plastic, paper or nonconductive paint or tape or the like, is bent around flange 64 so that the conductive member 60 is insulated from container 12 and also insulated from the bottom surface 76 of inner segment 68 of conductive ring 66. As shown in FIG. 5, the inner wall 72 makes electrical contact with conductive member 60 thereby adapting conductive member 60 as a terminal for cell 10. Conductive ring 66 functions to secure conductive member 60 to conductive container 12 while also adapting conductive member 60 as a terminal for the cell.

In FIG. 6, the closed end 16 of container 12 is shown bulged to a degree sufficient to lift conductive member 60 outward and away from closed end 16 of conductive container 12 to break the electrical contact between the wall 72 defining opening 74 in conductive ring 66 and protrusion portion 62 of conductive member 60. This will isolate conductive member 60 from the electrochemical system of the cell when the closed end 16 of container 12 bulges beyond the normal bulge that can be encountered in high temperature storage but below the degree of bulge that will break the seal and let electrolyte escape.

As stated above, insulator member 80 could be a flexible nonconductive material folded about flange 64 or could be a nonconductive paint deposited on the lower and upper surfaces of flange 64.

Although the present invention has been described with reference to particular details, it is not intended that these details shall be construed as limiting the scope of this invention.

What is claimed:

1. A sealed galvanic cell comprising a conductive container having an upstanding wall open at one end and closed at the opposite end and including in said container a positive electrode, a negative electrode and an electrolyte, said conductive container being in electrical contact with one of said electrodes; a first cover mounted over, secured to and electrically insulated from said open end of said conductive container and in electrical contact with the other electrode; a conductive member comprising a central protrusion portion with an extending flange disposed over and electrically insulated from the container; a conductive ring member disposed over the conductive member with the protrusion portion extending through and electrically contacting the wall defining an opening int he ring member, said protrusion portion making a friction fit with the wall, said conductive ring member having an inner segment disposed over and electrically insulated from the flange of the conductive member by a discreet nonconductive material that is disposed between the conductive member and the bottom surface of the inner segment, said conductive ring member further (and) having a peripheral segment secured to and in electrical contact with the conductive container thereby securing and electrically contacting the conductive member to the conductive container thereby adapting the conductive member as a terminal for the cell; and wherein he closed end of the container will bulge upon a predetermined pressure building up within the container to force the central protrusion portion of he conductive member outward thereby breaking the electrical contact between the wall defining the opening in the conductive ring and the protrusion of the conductive member.

2. The galvanic cell of claim 1 wherein the inner wall defining the opening in the conductive ring is bent upward so that the sharp corners of the edge of the wall are not positioned against the protrusion portion of the conductive member 3. The galvanic cell of claim 1 wherein a discrete nonconductive material is disposed between said conductive member and the closed end of said conductive container to electrically insulate said conductive member from said conductive container.

4. The galvanic cell of claim 3 wherein said nonconductive material is made from a material selected from the group comprising paper, plastic and ceramic.

5. The galvanic cell of claim 4 wherein said nonconductive material is a disc.

6. The galvanic cell of claim 4 wherein said disc comprises a conductive substrate coated with an electrically insulating material.

7. The galvanic cell of claim 1 wherein an electrically nonconductive layer of paint is disposed between said conductive member and the closed end of said conductive container to electrically insulate said conductive member from said conductive container.

8. The galvanic cell of claim 1 wherein said nonconductive material disposed between said conductive member and said conductive ring is made from a material selected from the group comprising paper, plastic and ceramic.

9. The galvanic cell of claim 8 wherein said nonconductive material between said conductive member and said conductive ring is an annulus.

10. The galvanic cell of claim 9 wherein said annulus comprises a conductive substrate coated with an electrically insulating material.

11. The galvanic cell of claim 1 wherein a layer of nonconductive paint is disposed between said conductive member and the bottom surface of the inner segment of the conductive ring so that said bottom surface is electrically insulated from said conductive member.

12. The galvanic cell of claim 1 wherein a nonconductive material is disposed over the bottom surface and upper surface of the flange of the conductive member so as to electrically insulate the conductive member from the container of the cell and from the bottom surface of the inner segment of the conductive ring.

13. The galvanic cell of claim 5 wherein a layer of adhesive is disposed between said disc and the closed end of said container.

14. The galvanic cell of claim 1 wherein a discrete nonconductive material is disposed between said conductive member and the closed end of said conductive container to electrically insulate said conductive member from said conductive container.

15. The galvanic cell of claim 14 wherein said discrete nonconductive material disposed between said conductive member and the closed end of said conductive container is a nonconductive disc.

16. The galvanic cell of claim 15 wherein said disc is made of a material selected from the group comprising paper, plastic and ceramic.

17. The galvanic cell of claim 1 wherein said container is a cylindrical container and said conductive member acts as an external cover member for the cell.

18. The galvanic cell of claim 1 where said positive electrode is $MnO_2$, said negative electrode is zinc and said electrolyte solution comprises potassium hydroxide.

* * * * *